United States Patent
Liu et al.

(10) Patent No.: US 11,408,908 B2
(45) Date of Patent: Aug. 9, 2022

(54) FIBER OPTIC SENSOR, MANUFACTURING METHOD THEREOF AND MOTION SENSING DEVICE

(71) Applicants: Beijing BOE Optoelectronics Technology Co., Ltd., Beijing (CN); BOE Technology Group Co., Ltd., Beijing (CN)

(72) Inventors: Yu Liu, Beijing (CN); Ming Zhai, Beijing (CN); Xiaoliang Fu, Beijing (CN)

(73) Assignees: BEIJING BOE OPTOELECTRONICS TECHNOLOGY CO., LTD.; BOE TECHNOLOGY GROUP CO., LTD.

( * ) Notice: Subject to any disclaimer, the term of this patent is extended or adjusted under 35 U.S.C. 154(b) by 217 days.

(21) Appl. No.: 16/644,264

(22) PCT Filed: Jun. 25, 2019

(86) PCT No.: PCT/CN2019/092728
§ 371 (c)(1),
(2) Date: Mar. 4, 2020

(87) PCT Pub. No.: WO2020/001425
PCT Pub. Date: Jan. 2, 2020

(65) Prior Publication Data
US 2021/0063430 A1    Mar. 4, 2021

(30) Foreign Application Priority Data
Jun. 26, 2018   (CN) .......................... 201810670006.8

(51) Int. Cl.
*G01R 33/032*    (2006.01)
*G01P 13/00*    (2006.01)
*G01P 15/093*    (2006.01)

(52) U.S. Cl.
CPC ............ *G01P 13/00* (2013.01); *G01P 15/093* (2013.01)

(58) Field of Classification Search
CPC .............................. G01P 13/00; G01P 15/093
See application file for complete search history.

(56) References Cited

U.S. PATENT DOCUMENTS

| 6,580,511 B1 | 6/2003 | Discenzo |
| 2004/0046111 A1* | 3/2004 | Swierkowski ........ G01P 15/093 250/227.21 |

(Continued)

FOREIGN PATENT DOCUMENTS

| CN | 2269593 Y | 12/1997 |
| CN | 2651754 Y | 10/2004 |

(Continued)

OTHER PUBLICATIONS

International search report of PCT application No. PCT/CN2019/092728 dated Sep. 30, 2019.

(Continued)

*Primary Examiner* — Mohamed Charioui
*Assistant Examiner* — Christine Y Liao
(74) *Attorney, Agent, or Firm* — Fay Sharpe LLP (57) ABSTRACT

A fiber optic sensor, a manufacturing method thereof and a motion sensing device relating to the field of sensors are provided. The fiber optic sensor includes a bushing, a magnetic mass block and a sensing optical fiber. The magnetic mass block is located in the bushing, and a magnetic fluid is adsorbed onto an outer surface, opposite to an inner wall of the bushing, of the magnetic mass block, such that the magnetic mass block is capable of being suspended in the bushing and moving along an axis of the bushing. One end of the sensing optical fiber is in a first end opening of the bushing. A surface, opposite to the sensing optical fiber, of (Continued)

the magnetic mass block is a reflecting surface. The sensing optical fiber is configured to provide incident light for the reflecting surface and to receive measuring light from the reflecting surface.

20 Claims, 4 Drawing Sheets

(56) References Cited

U.S. PATENT DOCUMENTS

| | | | |
|---|---|---|---|
| 2005/0172721 A1* | 8/2005 | Daigle | E21B 47/017 73/705 |
| 2012/0257208 A1* | 10/2012 | Andersen | G01H 9/004 356/477 |
| 2016/0098913 A1 | 4/2016 | Vastmans et al. | |

FOREIGN PATENT DOCUMENTS

| | | | | |
|---|---|---|---|---|
| CN | 200962056 | Y | | 10/2007 |
| CN | 201155991 | Y | | 11/2008 |
| CN | 201188116 | Y | | 1/2009 |
| CN | 103149384 | A | | 6/2013 |
| CN | 103149384 | B | * | 6/2013 |
| CN | 103758482 | A | | 4/2014 |
| CN | 103760616 | A | | 4/2014 |
| CN | 203909058 | U | | 10/2014 |
| CN | 104236597 | A | | 12/2014 |
| CN | 106525093 | A | | 3/2017 |
| CN | 108801306 | A | | 11/2018 |
| JP | 2000009506 | A | | 1/2000 |
| JP | 5807542 | B2 | * | 11/2015 ............. G01N 33/04 |

OTHER PUBLICATIONS

First office action of Chinese application No. 201810670006.8 dated Jul. 15, 2019.

* cited by examiner

FIBER OPTIC SENSOR, MANUFACTURING METHOD THEREOF AND MOTION SENSING DEVICE

This application is a 371 of PCT Application No. PCT/CN2019/092728, filed Jun. 25, 2019, which claims priority to Chinese Patent Application No, 201810670006.8, filed on Jun. 26, 2018 and entitled "FIBER OPTIC SENSOR AND METHOD FOR MANUFACTURING SWF, AND MOTION SENSING DEVICE" the entire contents of which are incorporated herein by reference.

TECHNICAL FIELD

The present disclosure relates to the field of sensors, and in particular to a fiber optic sensor, a manufacturing method thereof and a motion sensing device.

BACKGROUND

A magnetic fluid is a liquid magnetic material that has not only the fluidity of a liquid but also physical properties of some solid magnetic materials. Owing to a second-order suspension effect of the magnetic fluid, a permanent magnet can be suspended in the magnetic fluid. This phenomenon could be exploited to manufacture a level sensor, a velocity sensor, an acceleration sensor, etc. In the related art, most principles of these sensors are based on the Hall effect.

SUMMARY

The present disclosure provides a fiber optic sensor, a manufacturing method thereof and a motion sensing device.

In a first aspect, the present disclosure provides a fiber optic sensor, including a bushing, a magnetic mass block and a sensing optical fiber.

The magnetic mass block is located in the bushing, and a magnetic fluid is adsorbed onto an outer surface, opposite to an inner wall of the bushing, of the magnetic mass block, such that the magnetic mass block is capable of being suspended in the bushing and moving along an axis of the bushing.

One end of the sensing optical fiber stretches into a first end opening of the bushing. A reflecting surface is configured on an outer surface, opposite to the sensing optical fiber, of the magnetic mass block. The sensing optical fiber is capable of providing incident light for the reflecting surface and receiving measuring light from the reflecting surface.

In a possible implementation, the magnetic mass block includes an inner core and an annular permanent magnet that surrounds the inner core. The magnetic fluid is adsorbed onto an outer surface, opposite to the inner wall of the bushing, of the annular permanent magnet.

In a possible implementation, the inner core includes a first cylinder and a second cylinder which are coaxial with each other. A diameter of the first cylinder is smaller than that of the second cylinder. The annular permanent magnet is sleeved outside the first cylinder and abuts against the second cylinder.

In a possible implementation, the inner core is a section of optical fiber and has the same optical fiber specification as the sensing optical fiber.

In a possible implementation, the magnetic mass block includes a reflecting layer located on a surface, opposite to the sensing optical fiber, of the inner core. The reflecting surface is provided by the reflecting layer. Alternatively, the reflecting surface is an end surface of the inner core.

In a possible implementation, the fiber optic sensor further includes an elastic component located inside the bushing. A first end of the elastic component is fixedly connected to a second end opening of the bushing, and a second end of the elastic component is fixedly connected to the side, away from the sensing optical fiber, of the magnetic mass block.

In a possible implementation, the second end opening is an open end opening, the fiber optic sensor further includes a support fixedly connected, at the second end opening of the bushing, to the bushing, and the first end of the elastic component is fixedly connected to the support. Alternatively, the second end opening is a closed end opening to which the first end of the elastic component is fixedly connected.

In a possible implementation, the support is a supporting optical fiber of which one end stretches into the second end opening of the bushing.

In a possible implementation, the supporting optical fiber and the sensing optical fiber have the same optical fiber specification.

In a possible implementation, the fiber optic sensor further includes a rigid connector of which one end is fixedly connected to the side, away from the sensing optical fiber, of the magnetic mass block and the other end extends out of the second end opening of the bushing. A gap is between the rigid connector and the inner wall of the bushing.

Optionally, surfaces, opposite to each other, of the sensing optical fiber and the magnetic mass block are configured as two parallel cavity surfaces of a Fabry-Perot interferometric cavity.

In a possible implementation, the end of the sensing optical fiber, stretching into the bushing, is secured to the first end opening of the bushing.

In a possible implementation, a sealant is disposed between an outer surface of the sensing optical fiber and the inner wall of the bushing.

Optionally, the fiber optic sensor further includes an electromagnetic shielding layer located outside the bushing.

In a second aspect, the present disclosure further provides a motion sensing device, including a light source, an optical detector and at least one fiber optic sensor of any kind of the fiber optic sensors described above. The light source is configured to provide incident light for a sensing optical fiber of each of the fiber optic sensors. The optical detector is configured to detect measuring light from the sensing optical fiber of each of the fiber optic sensors.

In a possible implementation, the motion sensing device further comprises at least one circulator, wherein a first end of each of the circulators is connected to the light source, a second end of each of the circulators is connected to the sensing optical fiber of one of the fiber optic sensors, and a third end of each of the circulators is connected to the optical detector.

In a third aspect, the present disclosure further provides a manufacturing method of a fiber optic sensor, comprising:

disposing, in a bushing, a magnetic mass block having a magnetic fluid adsorbed onto an outer surface of the magnetic mass block, such that the magnetic mass block is capable of being suspended in the bushing and moving along an axis of the bushing, wherein at least a part of the outer surface, onto which the magnetic fluid is not adsorbed, of the magnetic mass block is a reflecting surface; and stretching one end of a sensing optical fiber into a first end opening of the bushing, such that the reflecting surface is opposite to the sensing optical fiber, and the sensing optical fiber is capable of providing incident light for the reflecting surface and receiving measuring light from the reflecting surface.

In a possible implementation, the disposing, in a bushing, a magnetic mass block having a magnetic fluid adsorbed onto an outer surface of the magnetic mass block comprises:
   stretching a magnetic mass block into a bushing; and
   dripping a magnetic fluid into the bushing, wherein the magnetic fluid that enters the bushing surrounds an outer surface of an annular permanent magnet after being adsorbed.

In a possible implementation, the disposing, in a bushing, a magnetic mass block having a magnetic fluid adsorbed onto an outer surface of the magnetic mass block comprises:
   stretching a magnetic mass block into a bushing; and
   drawing a magnetic fluid into the bushing under a capillary action, wherein the magnetic fluid that enters the bushing surrounds an outer surface of an annular permanent magnet after being adsorbed.

In a possible implementation, before disposing, in a bushing, a magnetic mass block having a magnetic fluid adsorbed onto an outer surface of the magnetic mass block, further comprising:
   cutting one optical fiber to obtain a first optical fiber section and a second optical fiber section; and
   manufacturing the sensing optical fiber by e first optical fiber section, and the magnetic mass block by the second optical fiber section.

DETAILED DESCRIPTION

In order to describe the principles, technical solutions and advantages in the embodiments of the present more clearly, the present disclosure will be described in detail below in combination with the accompanying drawings. Apparently, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure. Unless otherwise defined, technical terms or scientific terms used in the present disclosure shall be of ordinary meaning as understood by those of ordinary skill in the art to which the present disclosure pertains. The terms "first" or "second" or a similar term used in the present disclosure does not denote any order, quantity, or importance, but is merely used to distinguish different components. The term "comprising" or a similar term means that elements or items which appear before the term include the elements or items listed after the term and their equivalents, and do not exclude other elements or items.

Figure 1:
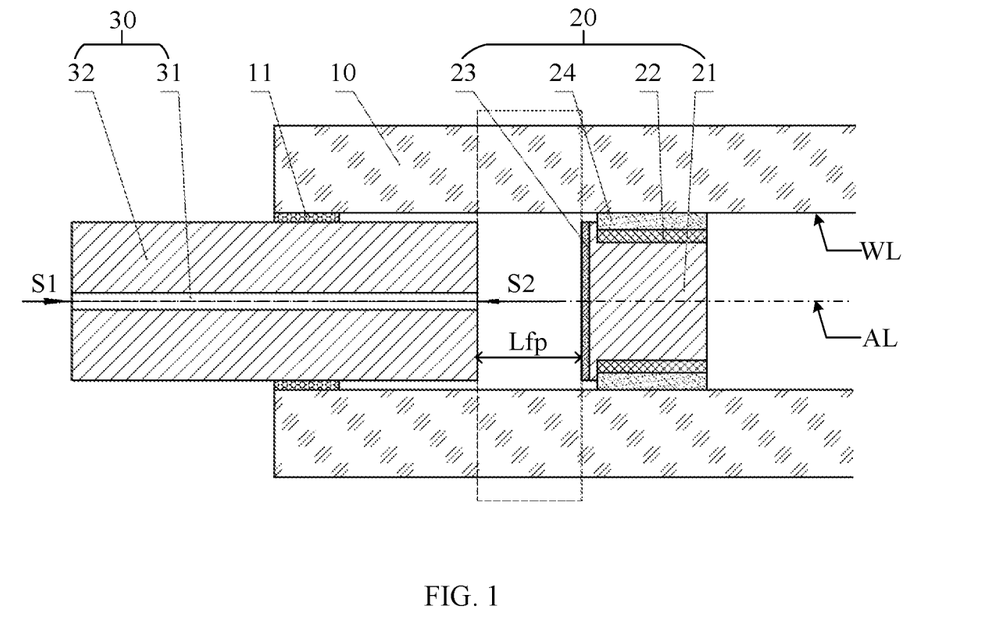
FIG. 1 is a schematic structural diagram of a fiber optic sensor provided by one embodiment of the present disclosure.

FIG. 1 is a schematic structural diagram of a fiber optic sensor provided by one embodiment of the present disclosure. As shown in FIG. 1 the fiber optic sensor includes a bushing 10, a magnetic mass block 20 and a sensing optical fiber 30. The magnetic mass block 20 is located in the bushing 10, and a magnetic fluid 24 is adsorbed onto an outer surface, opposite to an inner wall WL of the bushing 10, of the magnetic mass block 20, such that the magnetic mass block 20 is capable of being suspended in the bushing 10 and moving along an axis AL of the bushing 10. One end of the sensing optical fiber 30 stretches into a first end opening (e.g., a left end opening of the bushing 10 shown in FIG. 1) of the bushing 10. An outer surface, opposite to the sensing optical fiber 30, of the magnetic mass block 20 is a reflecting surface. The sensing optical fiber 30 is configured to provide incident light S1 for the reflecting surface and to receive measuring light S2 from the reflecting surface.

It should be understood that the fiber optic sensor is one type of sensors and mainly uses light emitted by the light source to interact with a parameter to be measured, such that, the intensity, wavelength, phase position, etc. of the light change to become a modulated signal. Thus, an optical signal can be demodulated to obtain a measured parameter. The magnetic fluid 24 may be selected from liquid magnetic materials according to application requirements. For example, the magnetic fluid 24 may be a stable magnetic colloidal solution obtained by dispersing magnetic particles in a liquid, and may be an oil-based magnetic fluid or a water-based magnetic fluid. Distribution of a magnetic field produced by the magnetic mass block 20 in a surrounding space may be designed by the types, contents and position distributions of the magnetic materials in the magnetic mass block 20, such that the magnetic fluid 24 may be adsorbed onto the surface of the corresponding portion of the magnetic mass block 20 according to distribution of the magnetic field. Accordingly, the magnetic fluid 24 can be adsorbed onto the outer surface, opposite to the inner wall WL of the bushing 10, of the magnetic mass block 20, and the magnetic mass block 20 can be suspended in the bushing 10 under the second-order suspension effect of the magnetic fluid. That is, the magnetic mass block 20 can overcome its own gravity by a buoyancy force stressed in the magnetic fluid, so that its surface can be separated from the inner wall WL of the bushing 10 to reduce or completely get rid of the action of a frictional force generated during a surface contact. Therefore, the magnetic mass block 20 can move along the axis AL, of the bushing 10 while maintaining a suspended status. During the motion, the magnetic mass block 20 may be free from the friction force, and the magnetic fluid 24 may move therewith under magnetic attraction of the magnetic mass block 20 without being affected by a shearing stress. Thus, the magnetic mass block 20 can move freely in the bushing 10.

It also should be understood that the sensing optical fiber 30 can transmit the optical signals in both directions. Therefore, the light source outside can be used to transmit the incident light S1 into the bushing 10, and to make the incident light S1 be incident onto the reflecting surface of the magnetic mass block 20. In this way, light is transmitted within a range marked with a dotted box in FIG. 1. At this time, a distance Lfp between an end surface of the sensing optical fiber 30 and the reflecting surface will affect phase distribution of reflected light received by the sensing optical fiber 30. Thus, the reflected light may be used as the measuring light that is transmitted from the sensing optical fiber to the optical detector outside, such that the optical detector can obtain, by detecting the measuring light, motion data of the magnetic mass block 20 moving along the axis AL of the bushing 10, Further, the parameter to be measured can be obtained.

It should be noted that any parameter that may affect the motion of the magnetic mass block 20 along the axis AL of the bushing 10 can be used as the parameter to be measured, such as displacement/velocity/acceleration of an object connected to the magnetic mass block 20 by a rigid connector, or levelness/acceleration of the bushing 10 after the magnetic mass block 20 is connected to the other end opening of the bushing 10 by an elastic component, which may not be limited thereto. Based on this, corresponding types of transmission components may be added to the above-mentioned structure of the fiber optic sensor (such as the structure of the fiber optic sensor shown in FIG. 1) according to the parameter to be measured that needs to be measured, such that the parameter to be measured directly or indirectly affects the motion of the magnetic mass block 20 along the axis AL of the bushing 10. Afterwards, the parameter to be measured is calculated by the above-mentioned method with reference to a corresponding relationship between the parameter to be measured and the motion data to realize a corresponding type of fiber optic sensor.

Optionally, the fiber optic sensor may further include an electromagnetic shielding layer located on an outer wall of the bushing. The electromagnetic shielding layer may be a metal shielding layer, e.g., a copper shielding layer.

It can be seen that the fiber optic sensor provided by the embodiment of the present disclosure is based on the principle of optical measurement and belongs to a passive device. The measuring light is not easily susceptible to electromagnetic interference during generation and transmission. Disposing the electromagnetic shielding layer outside the bushing will not affect normal operation of the fiber optic sensor. Therefore, the fiber optic sensor in the present embodiment may have very high electromagnetic interference prevention capability and sensitivity (there is no need to suppress electromagnetic interference at the expense of sensitivity). Based on the above structure, the fiber optic sensor in the present embodiment may have a radial dimension equivalent to that of an optical fiber (e.g., the radial dimension of the fiber optic sensor in FIG. 1 is approximately two times of a sum of the diameter of the optical fiber and the wall thickness of the bushing). Moreover, the required number of elements is small. Thus, the fiber optic sensor may have a very small size and mass, is suitable for various portable devices, wearable devices and microelectronic devices, and may be applied extensively. In addition, disposing the electromagnetic shielding layer outside the bushing will not affect the second-order suspension effect inside, so it is not easy to generate electromagnetic interference to the outside. Besides, based on the characteristics of a low loss rate of optical signals transmitted by the optical fiber and the ease of serial-parallel arrangement of optical signal elements, it is easy to realize remote distributed sensing measurement by disposing a long-distance optical fiber in combination with an optical-signal switching device.

In FIG. 1, as an example, a gap between the outer surface of the sensing optical fiber 30 and the inner wall WL of the bushing 10 is filled with a sealant, such that the sensing optical fiber 30 is secured to a first end opening of the bushing 10 and the first end opening of the bushing 10 is sealed. The fixation between the sensing optical fiber 30 and the first end opening of the bushing 10 is more conducive to fixing transmission directions and transmission paths of the incident light S1 and the measuring light S2, and makes detection and calculation more convenient. The sealing of the first end opening of the bushing 10 helps to prevent the magnetic fluid 24 from leaving the bushing 10 and also helps to exclude external oxygen and moisture.

In FIG. 1, as an example, the sensing optical fiber 30 includes a fiber core 31 and a cladding 32 that surrounds the fiber core 31. The incident light S1 and the measuring light S2 may be transmitted in the fiber core 31 by means of total reflection via the presetting that a refractive index of the cladding 32 matches that of the fiber core 31. As examples of materials, the sensing optical fiber 30 may be formed by a single-mode silica optical fiber, the bushing 10 may be formed by a quartz glass tube which has a tube diameter matching the diameter of the single-mode silica optical fiber, and a UV-curing adhesive or a glass cement may be used as the sealant 11. Of course, other material combinations may also be selected within a possible range without being limited to the above examples.

Figure 2:
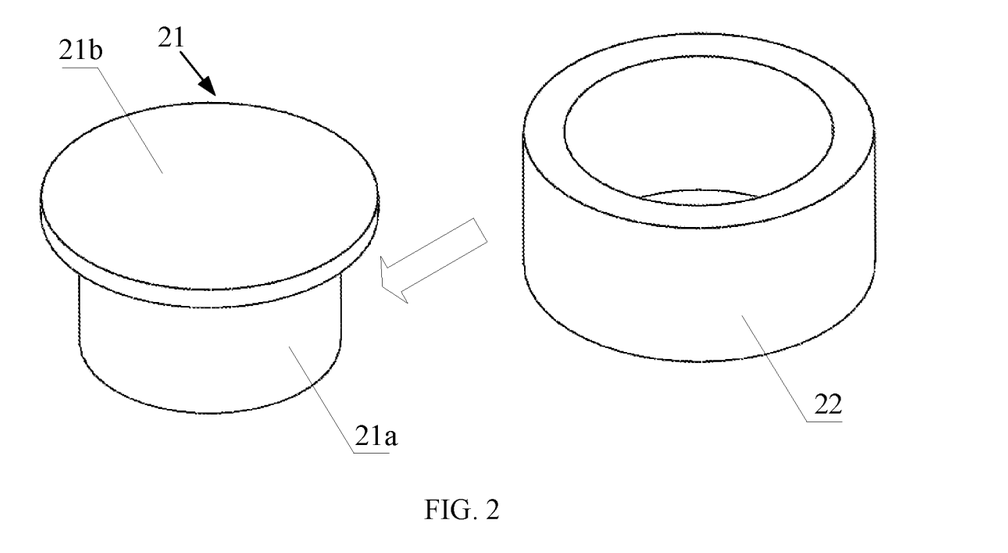
FIG. 2 is a schematic structural diagram of a magnetic mass block in a fiber optic sensor provided by one embodiment of the present disclosure.

FIG. 2 is a schematic structural diagram of a magnetic mass block in a fiber optic sensor provided by one embodiment of the present disclosure. Referring to FIG. 1 and FIG. 2, the magnetic mass block 20 includes an inner core 21 and an annular permanent magnet 22 that surrounds the inner core 21.

Exemplarily, the inner core 21 may include a first cylinder 21a and a second cylinder 21b which are coaxially connected. A diameter of the first cylinder 21a is smaller than that of the second cylinder 21b. The annular permanent magnet 22 is sleeved outside the first cylinder 21a and abuts against the second cylinder 21b. During assembly of the inner core 21 and the annular permanent magnet 22, the second cylinder 21b may play a limiting role.

As an example, during manufacture of the fiber optic sensor, a reflecting layer 23 may be manufactured on the top surface of the inner core 21 shown in FIG. 2 (namely, a surface opposite to the sensing optical fiber 30) to provide a reflecting surface. Then, the annular permanent magnet 22 is sleeved around the inner core 21 and secured by means of cementing. At last, the annular permanent magnet 22 with a magnetic fluid adsorbed onto an outer surface is placed in the bushing 10 to form the magnetic mass block 20 (as shown in FIG. 1, the magnetic fluid 24 is adsorbed onto the outer surface, opposite to the inner wall WL of the bushing 10, of the annular permanent magnet 22) shown in FIG. 1. Certainly, in addition to making the magnetic mass block magnetic by nesting the annular permanent magnet, an object including a magnetic material and having a corresponding shape may be made as the magnetic mass block 20, which may not be limited thereto.

Regarding the reflecting layer 23, for example, $HfO_2/SiO_2$ (namely, a $HfO_2$ layer and a $SiO_2$ layer which are laminated together) or a metal film may be deposited on a top surface of the inner core 21 by means of magnetron sputtering to form the reflecting layer 23 of which the reflectivity meets application requirements. In addition, the reflecting surface may be formed by, for example, grinding the top surface of the inner core 21, which may not be limited thereto.

Figure 3:
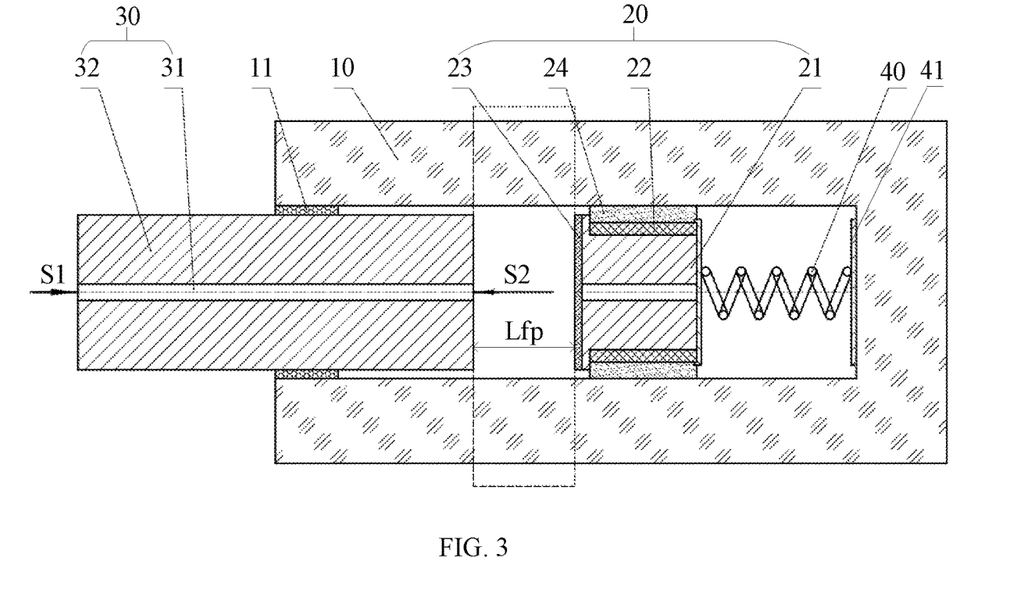
FIG. 3 is a schematic structural diagram of a fiber optic sensor provided by one embodiment of the present disclosure.

The followings will take an acceleration sensor as an example to describe an optional implementation mode of the above-mentioned fiber optic sensor. FIG. 3 is a schematic structural diagram of a fiber optic sensor provided by one embodiment of the present disclosure. Referring to FIG. 3, in comparison with the fiber optic sensor shown in FIG. 1, a second end opening (a right end opening in FIG. 3) of the bushing 10 in the fiber optic sensor shown in FIG. 3 is a closed end opening. Accordingly, the internal space of the bushing 10 can be made a closed space with reference to the above-described setting of the sealant 11. Thus, the motion of the magnetic mass block 20 is limited to the closed space inside the bushing 10 and the magnetic fluid is sealed in the bushing 10. In this way, the mass motion of the bushing 10 can change a motion state of the magnetic mass block 20. Further, an acceleration of the bushing 10 can be measured by detecting the measuring light S2.

Exemplarily, the fiber optic sensor shown in FIG. 3 further includes a micro spring 40 as an elastic component. A first end of the micro spring 40 is secured to the second end opening of the bushing 10, and a second end of the micro spring 40 is fixedly connected to the side, away from the sensing optical fiber 30, of the magnetic mass block 20. The micro spring 40 may play a role of returning the magnetic mass block 20 to an equilibrium position and/or limiting a motion range of the magnetic mass block 20.

Exemplarily, the two ends of the micro spring 40 may be connected to two bases 41 respectively. The micro spring 40 is connected to the magnetic mass block 20 and the second end opening by the bases 41. For example, one of the bases 41 may be clamped onto the magnetic mass block 20, That is, one end of the magnetic mass block 20 is inserted into one of the bases 41.

In the embodiment of the present disclosure, the end of the sensing optical fiber 30, stretching into the bushing 10, is secured to the first end opening of the bushing 10. A Fabry-Perot interferometer (an F-P interferometer) is formed between the sensing optical fiber 30 and the magnetic mass block 20. Surfaces, opposite to each other, of the sensing optical fiber 30 and the magnetic mass block 20 are configured as two parallel cavity surfaces of the Fabry-Perot interferometer (an F-P interferometer), The incident light S1 is subjected to multi-beam interference in the F-P interferometer and then becomes the measuring light received by the sensing optical fiber 30. When an acceleration is induced, the measuring light S2, which is used as interference light, undergoes a phase shift. The acceleration can be inverted by this change.

Figure 4:
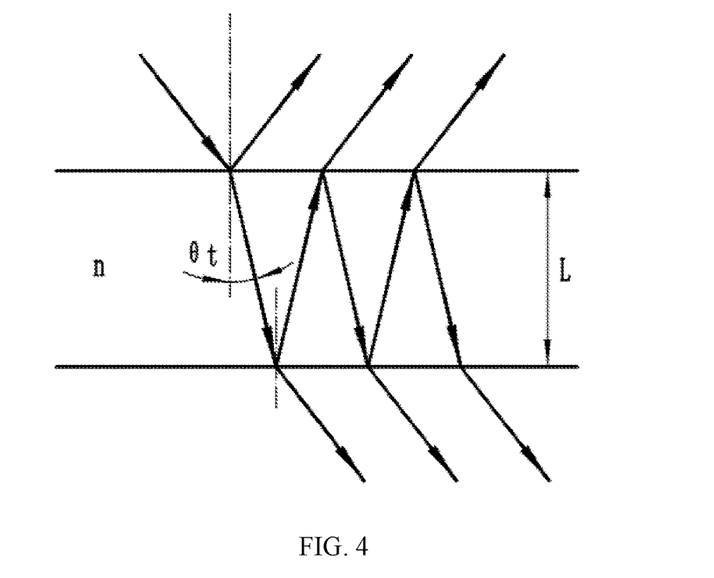
FIG. 4 is a schematic diagram showing an operating principle of a fiber optic sensor provided by one embodiment of the present disclosure.

FIG. 4 is a schematic diagram showing an operating principle of a fiber optic sensor provided by one embodiment of the present disclosure. In the F-P interferometer shown in FIG. 4, n is a refractive index of a medium between the two F-P parallel cavity surfaces, L is a distance between the two parallel cavity surfaces, and $\theta_t$ is an angle formed between light transmitted between the two parallel cavity surfaces and a normal vector of an optical plane. For a plurality of light waves formed by back-and-forth reflection between the two parallel cavity surfaces, an optical path difference $\Delta L$ between two adjacent light waves (e.g., any two adjacent arrows pointing upwards in FIG. 4 indicate two adjacent light waves) can be calculated by formula (1):

$$\Delta L = 2nL \cos \theta_t \quad (1).$$

The formed phase difference $\Delta\varphi$ can be calculated by formula (2):

$$\Delta\varphi = \frac{2\pi}{\lambda} \cdot 2nL\cos\theta_t. \quad (2)$$

in which $\lambda$ is the wavelength of the transmitted light, and $\pi$ is the circular constant. It can be known from the above formula that the phase difference $\Delta\varphi$ is mainly relevant to the refractive index n of the medium and the distance L between the two parallel cavity surfaces. For the fiber optic sensor shown in FIG. 3, the refractive index n is a known fixed value, and the distance Lfp (namely, L) between the parallel cavity surfaces is a variable. When an acceleration is induced, the distance Lfp between the parallel cavity surfaces changes, such that a spectral phase of the measuring light S2 which serves as interference light changes. Thus, the value of this acceleration can be measured.

In one example, when the magnetic mass block 20 is in the center equilibrium position, between the parallel cavity surfaces the distance Lfp=$L_0$. When the fiber optic sensor receives the acceleration a, the magnetic mass block 20 moves along the axis to generate a displacement $\Delta L$ and to compress the micro spring 40 till it reaches a new force equilibrium position. At this time, a restoring force from the micro spring 40 can be expressed by formula (3):

$$F_t = k\Delta L = ma \quad (3),$$

in which k is a spring coefficient of the micro spring 40, and m is a mass of the magnetic mass block 20. The phase difference of the magnetic mass block 20 in the center equilibrium position is set to be $\Delta\varphi_0$. After the fiber optic sensor receives the acceleration a, the magnetic mass block 20 moves to the new equilibrium position along the axis. The corresponding phase difference is $\Delta\varphi_0+\Delta\varphi$. With reference to the expression (namely, formula (2)) of the phase difference, it can be known:

$$\Delta\varphi_0 = \frac{2\pi}{\lambda} 2nL_0 \cos\theta_t, \quad (4)$$

$$(\Delta\varphi_0 + \Delta\varphi) = \frac{2\pi}{\lambda} 2n(L_0 + \Delta L) \cos\theta_t. \quad (5)$$

It can be inferred by subtracting formula (4) and formula (5):

$$\Delta\varphi = \frac{2\pi}{\lambda} 2n\cos\theta_t \Delta L = \frac{2\pi}{\lambda} 2n\cos\theta_t \frac{ma}{k}. \quad (6)$$

Based on this formula (6), the acceleration a received by the fiber optic sensor is calculated from the phase difference $\Delta\varphi$ detected based on the measuring light S2 to achieve the functions of the acceleration sensor with reference to the wavelengths $\lambda$ of the incident light S1 and the measuring light S2, the refractive index n of the medium between the parallel cavity surfaces, the spring coefficient k of the micro spring 40, the mass m of the magnetic mass block 20, and the angle $\theta_t$ formed between the light transmitted between the two parallel cavity surfaces and the normal vector of the optical plane.

Figure 5:
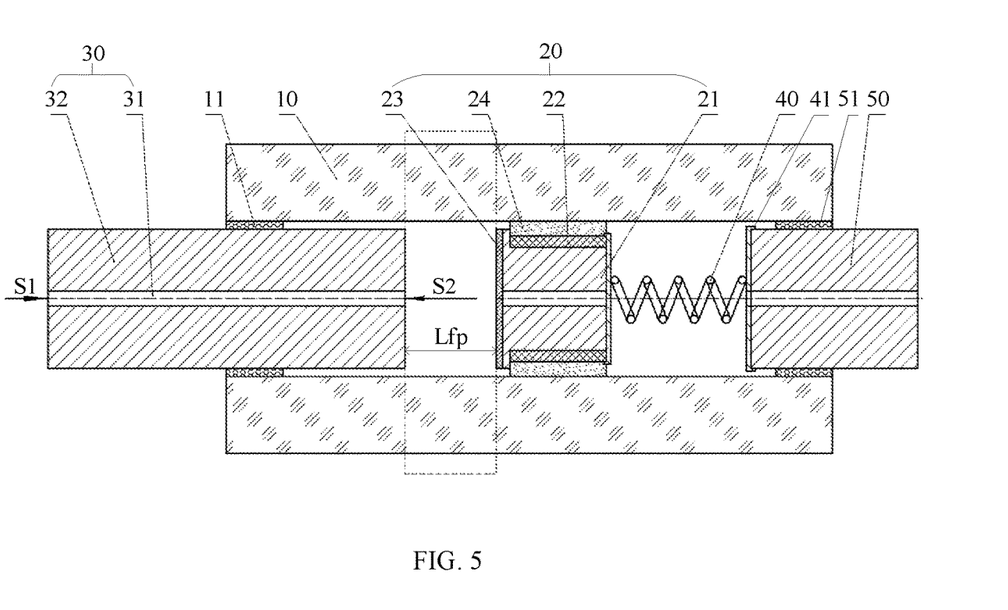
FIG. 5 is a schematic structural diagram of a fiber optic sensor provided by one embodiment of the present disclosure.

Certainly, based on the fiber optic sensor shown in FIG. 1, FIG. 2 or FIG. 5, such sensors as a displacement sensor, a level sensor, a force sensor and an acceleration sensor (which may not be limited thereto) can be realized using the relationship between the phase change in the F-P interferometer and changes of the distance between the parallel cavity surfaces. All of these sensors can be realized with reference to the related art, which will not be repeated herein one by one.

In addition, with respect to FIG. 1, a short section of optical fiber with the same optical fiber specification as the sensing optical fiber 30 is used in FIG. 3 as the inner core 21 of the magnetic mass block 20, such that the process of separately designing the inner core 21 to make its shape and size match those of other portions may be simplified and the species of raw materials may be reduced to simplify the manufacturing process of the fiber optic sensor. Here, the same optical fiber specification may refer to that the species of optical fibers are the same. For example, G.654 single-mode optical fibers are chosen.

As stated above, the optical fiber may include a cladding and a fiber core. In this case, the inner core 21 may be obtained by cutting off part of the cladding.

Regarding the micro spring 40 as the elastic component, it should be understood that the micro spring may be replaced with any one of other types of elastic components, such as a rubber component, an elastic fiber and other types of springs, or a composite elastic component combined by at least two types of elastic elements (e.g., an elastic component combined by connecting two ends of a rubber block to two springs respectively), which may not be limited thereto. Identical to the micro spring 40, the substitute elastic component may also play the role of returning the magnetic mass block 20 to the equilibrium position and/or limiting the motion range of the magnetic mass block 20, and may serve as one link in transmission parts connected to the magnetic mass block 20.

As yet another example of the implementation mode of the acceleration sensor, FIG. 5 is a schematic structural diagram of a fiber optic sensor provided by one embodiment of the present disclosure. Its difference from the structure of the fiber optic sensor shown in FIG. 4 is that the second end opening of the bushing 10 in FIG. 5 is an open end opening, and the fiber optic sensor further includes a support 50 connected to the bushing 10 at the second end opening. Besides, the micro spring as the elastic component is fixedly connected to the support 50 by a first end to be secured to the second end opening of the bushing 10.

Exemplarily, the two ends of the micro spring 40 may be connected to two bases 41 respectively. The micro spring 40 is connected to the magnetic mass block 20 and the support 50 by the bases 41. For example, one of the bases 41 may be clamped onto the magnetic mass block 20. That is, one end of the magnetic mass block 20 is inserted into one of the bases 41. Similarly, the other base 41 may be clamped onto the support 50. That is, the support 50 is inserted into the other base 41.

As an example, the support 50 is realized by a supporting optical fiber. One end of the supporting optical fiber stretches into the second end opening of the bushing 10. An outer surface of the supporting optical fiber is glued to the inner wall of the bushing 10. It should be understood that the supporting optical fiber may have the same optical fiber specification as the sensing optical fiber 30, and may be glued in the same manner of filling with the sealant as the sensing optical fiber 30.

It should be understood that the support 50 may also be realized by, for example, a pipe hole cover or a pipe hole plug, and may not be limited thereto. Compared with other implementation methods, the use of the supporting optical fiber with the same optical fiber specification as the sensing optical fiber 30 may eliminate the process of separately designing the support 50 to make its shape and size match those of other portions. In addition, the manufacturing process of the fiber optic sensor may be simplified by raw materials and/or supporting processes identical with the sensing optical fiber 30.

Figure 6:
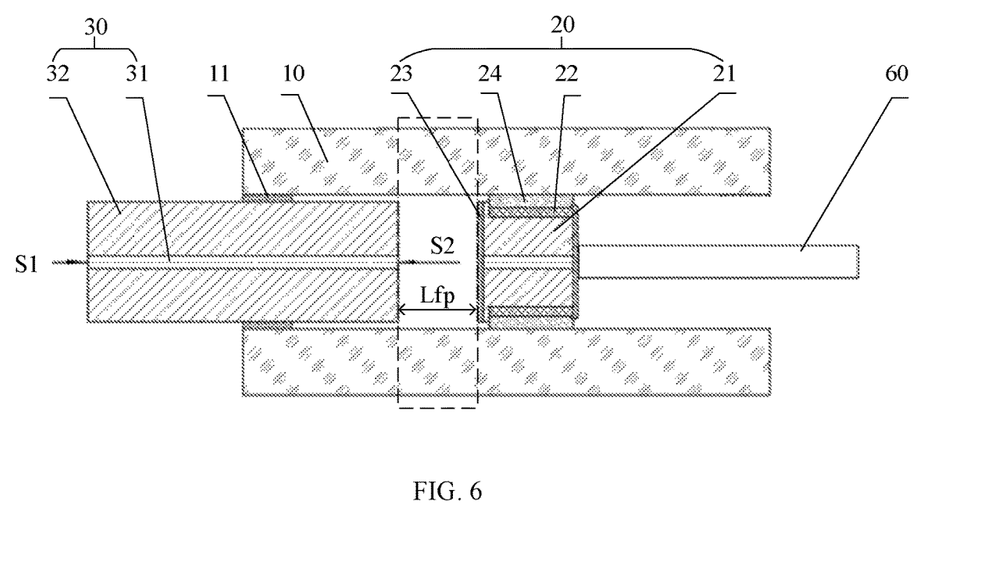
FIG. 6 is a schematic structural diagram of a fiber optic sensor provided by one embodiment of the present disclosure.

FIG. 6 is a schematic structural diagram of a fiber optic sensor provided by one embodiment of the present disclosure. Different from the structure of the fiber optic sensor shown in FIG. 1, the fiber optic sensor shown in FIG. 6 further includes a rigid connector 60 of which one end is fixedly connected to the side, away from the sensing optical sensor 30, of the magnetic mass block 20 and the other end extends out of the second end opening of the bushing 10. A gap is reserved between the rigid connector 60 and the inner wall WL of the bushing 10.

The end, extending out of the second end opening of the bushing 10, of the rigid connector 60 is in contact with or connected to a detected object. The detected object moves to drive the rigid connector 60 to move, such that the magnetic mass block 20 is driven to move. The motion of the magnetic mass block 20 leads to a length change of the F-P interferometer. Further, the measured parameter can be determined based on the length change of the F-P interferometer.

Exemplarily, the rigid connector 60 may include a connecting rod that may be coaxial with the sensing optical fiber 30.

In order to prevent the magnetic mass block 20 from leaving the bushing 10, an inner flange or other limiting structures may be disposed at the second end opening of the hushing as long as it affects the motion of the rigid connector 60 in the bushing 10.

Figure 7:
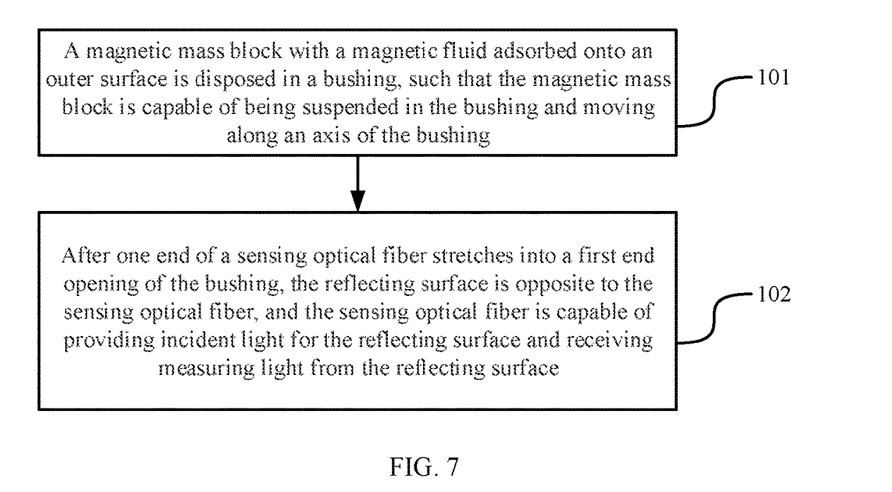
FIG. 7 is a schematic flow chart of a manufacturing method of a fiber optic sensor provided by one embodiment of the present disclosure.

FIG. 7 is a schematic flow chart of a manufacturing method of a fiber optic sensor provided by one embodiment of the present disclosure. Referring to FIG. 7, the method includes the following steps.

In step 101, a magnetic mass block with a magnetic fluid adsorbed onto an outer surface is disposed in a bushing, such that the magnetic mass block is capable of being suspended in the bushing and moving along an axis of the bushing. An outer surface, onto which the magnetic fluid is not adsorbed, of the magnetic mass block is at least in part a reflecting surface.

In step 102, after one end of a sensing optical fiber stretches into a first end opening of the bushing, the reflecting surface is opposite to the sensing optical fiber, and the sensing optical fiber is capable of providing incident light for the reflecting surface and receiving measuring light from the reflecting surface.

In one example, before step 101, the method further includes the following steps not shown in FIG. 7: cutting one optical fiber to obtain a first optical fiber section and a second optical fiber section; and manufacturing the sensing optical fiber by the first optical fiber section, and the magnetic mass block by the second optical fiber section. For example, the second optical fiber section may be the inner core 21 for manufacturing the magnetic mass block 20. At this time, the inner core 21 and the sensing optical fiber 30 that are obtained by cutting the same optical fiber have the same optical fiber specification. Thus, the process of separately designing the inner core 21 to make its shape and size match those of other portions may be simplified. Further, the species of raw materials may be reduced to simplify the manufacturing process of the fiber optic sensor.

Taking the structure of the fiber optic sensor shown in FIG. 5 as an example, the manufacturing method of the fiber optic sensor may include: cutting an optical fiber to obtain a first optical fiber section, a second optical fiber section, and a third optical fiber section. The second optical fiber section is processed into the inner core 21 as shown in FIG. 2, a reflecting layer 23 is formed on the top surface of the inner core 21 to provide a reflecting surface, and then an annular permanent magnet 22 is disposed around the inner core 21 and fixed in a gluing manner to complete manufacture of the magnetic mass block 20. Next, the two ends of a micro spring 40 are fixedly connected to the bottom surface of the inner core 21 and an end surface of the third optical fiber section serving as a supporting optical fiber respectively. The bushing 10 and the magnetic mass block 20 are secured by supporting structures respectively. The side, on which the reflecting layer 23 is deposited, of the magnetic mass block 20 inwardly extends into the bushing 10. Subsequently, a magnetic fluid is dripped into the bushing 10, or the bushing 10 is placed in a magnetic fluid. The magnetic fluid is sucked into the bushing 10 by a capillary action, and the magnetic fluid that enters the bushing 10 is adsorbed and then surrounds an outer surface of the annular permanent magnet 22. After that, a visual inspection mechanism may be used to check the setting of the magnetic mass block in the bushing 10 to avoid abnormalities. Then, the third optical fiber section and the bushing 10 are respectively fixed by supporting mechanisms. After the third optical fiber section stretches into the second end opening of the bushing 10, a space between an outer surface of the third optical fiber section and the inner wall of the bushing 10 is filled with a sealant to complete fixation between the supporting optical fiber and the second end opening of the bushing 10 and sealing of the second end opening of the bushing 10. At last, after the end surface at one end of the first optical fiber section is processed into a high-reflectivity interface, the first optical fiber section and the bushing 10 are also respectively fixed by supporting mechanisms. The end of the first optical fiber section serving as the sensing optical fiber 30 stretches into the first end opening of the bushing 10. After the stretching portion is adjusted to be level, the gap between the outer surface of the first optical fiber section and the inner wall of the bushing 10 is filled with a sealant to complete fixation between the sensing optical fiber 30 and the first end opening of the bushing 10 and sealing of the first end opening of the bushing 10. So far, manufacture of the fiber optic sensor shown in FIG. 5 has been completed.

It should be understood that the fiber optic sensor manufactured by the method of the present embodiment may be any one of the above-mentioned fiber optic sensors. Therefore, based on different structural details of the fiber optic sensor, a corresponding method may be adopted to implement manufacture of the fiber optic sensor according to related technologies, which will not be repeated one by one. Based on the internal structure of the fiber optic sensor, it is possible to provide incident light and collect measuring light by the sensing optical fiber, and to obtain a motion parameter of the magnetic mass block by detecting the measuring light, thus realizing measurement of the parameter to be measured. Since the fiber optic sensor is a passive device, the measuring light is not susceptible to electromagnetic interference during generation and transmission, and the magnetic mass block can move freely along the axis of the bushing based on the second-order suspension action of the magnetic fluid. Thus, a very high sensitivity may be achieved with reference to an optical measurement principle. Moreover, the fiber optic sensor is simple in structure, small in size and mass and easy to realize long-distance measurement and distributed measurement.

Figure 8:
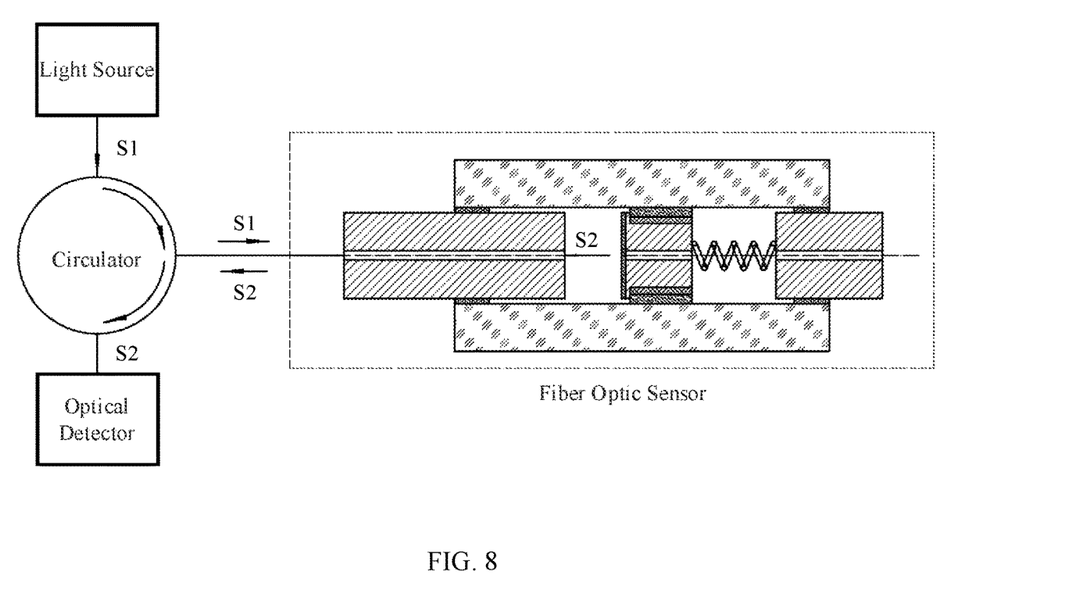
FIG. 8 is a schematic structural diagram of a motion sensing device provided by one embodiment of the present disclosure.

FIG. 8 is a schematic structural diagram of a motion sensing device provided by one embodiment of the present disclosure. Referring to FIG. 8, the motion sensing device includes a light source, an optical detector, and at least any one of the fiber optic sensors (in FIG. 8, a fiber optic sensor having a structure as shown in FIG. 5 is taken as an example). The light source is configured to provide incident light S1 for a sensing optical fiber of each fiber optic sensor. The optical detector is configured to detect measuring light S2 from the sensing optical fiber of each fiber optic sensor. For the above example of the F-P interferometer, the light source can couple the incident light S1 into the sensing optical fiber according to the set wavelength $\lambda$ and angle $\theta_r$. The optical detector can detect a phase difference change $\Delta\varphi$ of the measuring light S2. Accordingly, an acceleration of the fiber optic sensor is measured according to the above-mentioned principle in combination with a corresponding calculation part.

Exemplarily, the light source may be a broadband light source having a wavelength of 1,000 nm to 1,680 nm.

As an example, the motion sensing device further includes at least one circulator (FIG. 8 takes one circulator as an example). A first end (upper end) of each of the circulators is connected to the light source, a second end (right end) of each of the circulators is connected to a sensing optical fiber of the fiber optic sensor, and a third end (lower end) of each of the circulators is connected to the optical detector, such that the incident light S1 is unidirectionally transmitted between the light source and any one of the sensing optical fibers, and the measuring light S2 is unidirectionally transmitted between any one of the sensing optical fibers and the optical detector. In this way, the unidirectional transmission characteristic of the circulator may be used to couple the incident light S1 into the sensing optical fiber while receiving the measuring light S2 from the sensing optical fiber. It should be understood that the transmission path of the measuring light S2 in different sensor network topologies may also be implemented through other optical-signal switching parts, which is not limited to the above examples. For example, a plurality of fiber optic sensors that measures the same acceleration value may use the same circulator to transmit a plurality of measuring light S2 generated to the optical detector for unified detection so as to simplify the internal structure of the motion sensing device.

It should be noted that the motion sensing device refers to a device having a motion sensing function, and may be but not limited to, for example, a sensor, a sensor string or a sensor array, or an electronic device including a sensor, such as various types of wearable devices (a smart bracelet, a smart watch, a smart caning, a smart necklace, a head-mounted display, etc.) or a terminal device (a laptop, a PDA, a mobile phone, a tablet PC, a wireless terminal device, a communication device, an embedded device or devices of similar structures).

Where possible, technical elements in different aspects, described in the above examples, can be combined with one another. Moreover, the foregoing descriptions are merely exemplary embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A fiber optic sensor, comprising a bushing, a magnetic mass block and a sensing optical fiber, wherein
    the magnetic mass block is located in the bushing, and the magnetic mass block comprises an inner core and an annular permanent magnet that surrounds the inner core; the inner core is a section of optical fiber and comprises a fiber core and a cladding that surrounds the fiber core, one end of the cladding away from the sensing optical fiber is cut off in a circumferential direction, so as to form an annular groove in the cladding, and the annular permanent magnet is located in the annular groove; a magnetic fluid is adsorbed onto an outer surface of the annular permanent magnet opposite to an inner wall of the bushing, such that the magnetic mass block is capable of being suspended in the bushing and moving along an axis of the bushing; and one end of the sensing optical fiber is located in a first end opening of the bushing, a surface of the magnetic mass block opposite to the sensing optical fiber is a reflecting surface, and the sensing optical fiber is configured to provide incident light for the reflecting surface and to receive measuring light from the reflecting surface, the inner core has the same optical fiber specification as the sensing optical fiber.

2. The fiber optic sensor according to claim 1, wherein the reflecting surface is implemented by one of the following structures:

the magnetic mass block comprises a reflecting layer located on a surface of the inner core opposite to the sensing optical fiber; and the reflecting surface is provided by the reflecting layer; or the reflecting surface is an end surface of the inner core.

3. The fiber optic sensor according claim 1, further comprising an elastic component located inside the bushing, wherein a first end of the elastic component is fixedly connected to a second end opening of the bushing, and a second end of the elastic component is fixedly connected to a side of the magnetic mass block away from the sensing optical fiber.

4. The fiber optic sensor according to claim 3, wherein the first end of the elastic component is fixedly connected to the second end opening of the bushing in any of the following ways:

the second end opening is an open end opening, the fiber optic sensor further comprises a support fixedly connected to the bushing at the second end opening of the bushing, and the first end of the elastic component is fixedly connected to the support; and the second end opening is a closed end opening to which the first end of the elastic component is fixedly connected.

5. The fiber optic sensor according to claim 4, wherein the support is a supporting optical fiber of which one end is located in the second end opening of the bushing.

6. The fiber optic sensor according to claim 5, wherein the supporting optical fiber and the sensing optical fiber have the same optical fiber specification.

7. The fiber optic sensor according to claim 1, further comprising a rigid connector of which one end is fixedly connected to a side of the magnetic mass block away from the sensing optical fiber and the other end extends out of a second end opening of the bushing, wherein a gap is between the rigid connector and the inner wall of the bushing.

8. The fiber optic sensor according to claim 1, wherein surfaces of the sensing optical fiber and the magnetic mass block opposite to each other are configured as two parallel cavity surfaces of a F-P cavity.

9. The fiber optic sensor according to claim 1, wherein the end of the sensing optical fiber, located in the bushing, is secured to the first end opening of the bushing.

10. The fiber optic sensor according to claim 9, wherein a sealant is disposed between an outer surface of the sensing optical fiber and the inner wall of the bushing.

11. The fiber optic sensor according to claim 1, further comprising an elastic component and a support; wherein the support is fixedly connected to the bushing at the second end opening of the bushing, and the support is a supporting optical fiber having the same optical fiber specification as the sensing optical fiber;

the elastic component is inside the bushing, the first end of the elastic component is fixedly connected to the support, and a second end of the elastic component is fixedly connected to the side of the magnetic mass block away from the sensing optical fiber;

surfaces of the sensing optical fiber and the magnetic mass block opposite to each other are configured as two parallel cavity surfaces of a F-P cavity.

12. The fiber optic sensor according to claim 11, wherein two ends of the elastic component are connected to two different bases respectively, and the two bases are respectively connected to the magnetic mass block and the second end opening of the bushing.

13. The fiber optic sensor according to claim 1, wherein the sensing optical fiber comprises a second fiber core and a second cladding that surrounds the second fiber core, a refractive index of the second cladding matches that of the second fiber core, such that incident light and measuring light is capable of being transmitted in the second fiber core by means of total reflection.

14. The fiber optic sensor according to claim 1, in a radial direction of the inner core, a depth of the annular groove is greater than a wall thickness of the annular permanent magnet, so that the magnetic fluid is located between the outer surface of the annular permanent magnet and an inner surface of the bushing, and a radial dimension of the fiber optic sensor is a sum of a diameter of the optical fiber and two times of a wall thickness of the bushing.

15. A motion sensing device, comprising a light source, an optical detector and at least one fiber optic sensor, wherein the fiber optic sensor comprises a bushing, a magnetic mass block and a sensing optical fiber, wherein the magnetic mass block is located in the bushing, and the magnetic mass block comprises an inner core and an annular permanent magnet that surrounds the inner core; the inner core is a section of optical fiber and comprises a fiber core and a cladding that surrounds the fiber core, one end of the cladding away from the sensing optical fiber is cut off in a circumferential direction, so as to form an annular groove in the cladding, and the annular permanent magnet is located in the annular groove; a magnetic fluid is adsorbed onto an outer surface of the annular permanent magnet opposite to an inner wall of the bushing, such that the magnetic mass block is capable of being suspended in the bushing and moving along an axis of the bushing;

one end of the sensing optical fiber is located in a first end opening of the bushing, a surface of the magnetic mass block opposite to the sensing optical fiber is a reflecting surface, and the sensing optical fiber is configured to provide incident light for the reflecting surface and to receive measuring light from the reflecting surface; and the light source is configured to provide incident light for a sensing optical fiber of each of the fiber optic sensors, and the optical detector is configured to detect measuring light from the sensing optical fiber of each of the fiber optic sensors, the inner core has the same optical fiber specification as the sensing optical fiber.

16. The motion sensing device according to claim 15, further comprising at least one circulator, wherein a first end of each of the circulators is connected to the light source, a second end of each of the circulators is connected to the sensing optical fiber of one of the fiber optic sensors, and a third end of each of the circulators is connected to the optical detector.

17. A manufacturing method of a fiber optic sensor, comprising:

disposing, in a bushing, a magnetic mass block that comprises an inner core and an annular permanent magnet that surrounds the inner core; the inner core is a section of optical fiber and comprises a fiber core and a cladding that surrounds the fiber core, one end of the cladding away from the sensing optical fiber is cut off in a circumferential direction, so as to form an annular groove in the cladding, and the annular permanent magnet is located in the annular groove; a magnetic fluid adsorbed onto an outer surface of the annular permanent magnet opposite to an inner wall of the bushing, such that the magnetic mass block is capable of being suspended in the bushing and moving along an axis of the bushing, wherein at least a part of the outer surface of the magnetic mass block onto which the magnetic fluid is not adsorbed is a reflecting surface; and stretching one end of a sensing optical fiber into a first end opening of the bushing, such that the reflecting surface is opposite to the sensing optical fiber, and the sensing optical fiber is capable of providing incident light for the reflecting surface and receiving measuring light from the reflecting surface, the inner core has the same optical fiber specification as the sensing optical fiber.

18. The method according to claim 17, wherein the disposing, in a bushing, a magnetic mass block having a magnetic fluid adsorbed onto an outer surface of the magnetic mass block comprises:

stretching a magnetic mass block into a bushing; and
dripping a magnetic fluid into the bushing, wherein the magnetic fluid that enters the bushing surrounds an outer surface of an annular permanent magnet after being adsorbed.

19. The method according to claim 17, wherein the disposing, in a bushing, a magnetic mass block having a magnetic fluid adsorbed onto an outer surface of the magnetic mass block comprises:

stretching a magnetic mass block into a bushing; and
drawing a magnetic fluid into the bushing under a capillary action, wherein the magnetic fluid that enters the bushing surrounds an outer surface of an annular permanent magnet after being adsorbed.

20. The method according to claim 17, before disposing, in a bushing, a magnetic mass block having a magnetic fluid adsorbed onto an outer surface of the magnetic mass block, further comprising:

cutting one optical fiber to obtain a first optical fiber section and a second optical fiber section; and
manufacturing the sensing optical fiber by the first optical fiber section, and the inner core by the second optical fiber section.

\* \* \* \* \*